United States Patent

Bonneau et al.

[15] 3,647,175
[45] Mar. 7, 1972

[54] FLUID FLOW CONTROL VALVE

[72] Inventors: André Bonneau, 26, rue de l'Avenir, Perpignan; Henri Bontems, rue des Trilles, Elne (Pyrenees Orientales), both of France

[22] Filed: Mar. 4, 1970

[21] Appl. No.: 16,322

[30] Foreign Application Priority Data

Mar. 18, 1969 France.................................6907717

[52] U.S. Cl. ..............................................251/61
[51] Int. Cl. .............................................F16k 31/12
[58] Field of Search ........................251/61, 149.8, 339

[56] References Cited

UNITED STATES PATENTS

| | | | |
|---|---|---|---|
| 2,271,785 | 2/1942 | Watkins | 251/149.8 X |
| 3,433,456 | 3/1969 | Mueller | 251/339 |
| 3,486,731 | 12/1969 | Magnani et al. | 251/61 X |
| 229,695 | 7/1880 | Granger | 251/335.1 |
| 1,600,481 | 9/1926 | Nadig | 251/149.8 X |
| 3,155,365 | 11/1964 | Hartung et al. | 251/60 X |

FOREIGN PATENTS OR APPLICATIONS

| | | | |
|---|---|---|---|
| 1,038,856 | 9/1958 | Germany | 251/30 |
| 1,110,895 | 10/1955 | France | 251/30 |

*Primary Examiner*—Samuel Scott
*Attorney*—Young & Thompson

[57] ABSTRACT

A fluid flow control valve comprises a cylindrical tube slidably mounted in a wall between the inlet and outlet valve chambers. One end of the tube is spring urged against the valve seat, so that the spring action plus the pressure against the other end of the tube holds the valve closed. In the open valve position, what acts on the tube is the spring and the difference of the pressures in the two chambers that bear against the tube ends.

3 Claims, 1 Drawing Figure

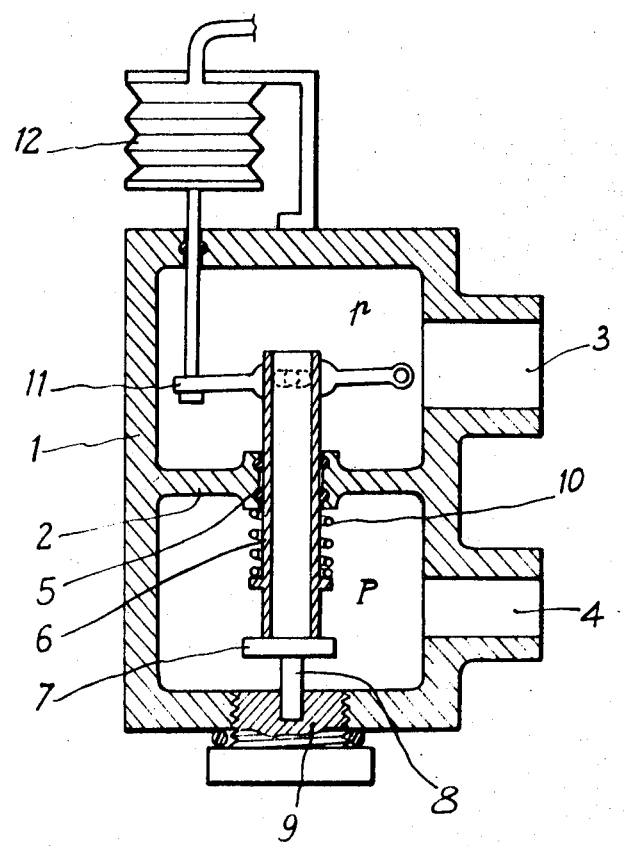

FLUID FLOW CONTROL VALVE

The present invention relates to fluid flow control valves.

Known flap valves, particularly expansion valves have, in use, a flap or valve member subjected on one of its faces to the action of a fluid at high pressure and on the other face to the action of fluid at low pressure. To ensure sealed closing, it is essential that the difference between the pressures is such that the flap or valve member is applied positively to its seat. In general this positive application of the valve to its seat is ensured solely by the difference between the pressures of the fluids acting on the two faces of the valves, and the urging force towards the position in which the valve is pressed on its seat has a not inconsiderable value which has to be overcome by a control device of the valve. In numerous applications, in particular in respiratory expansion valves, such as those used for underwater diving equipment, the pressure differential controlling the functioning, i.e., in particular low pressure on intake, is extremely low and manometric cells of large section must be used, associated with compensation springs and lever arms of considerable strength to overcome the force applying the valve to its seat. In spite of these measures, the diameter of the nozzle, that is to say the passage section for the fluid, is still limited and the flap valve remains very sensitive to the differences between the low and high pressure which acts directly on the force necessary for controlling the valve. Moreover, these flap valves cannot function simultaneously in both directions.

An object of the present invention is to provide a valve which requires only a small actuating force.

Another object of the present invention is the provision of a valve having a valve member which is acted on by different forces in its open and closed positions.

Finally, it is an object of the present invention to provide a valve which will be relatively simple and inexpensive to manufacture, easy to install, operate, maintain and repair, and rugged and durable in use.

Other objects and advantages of the present invention will become apparent from a consideration of the following description, taken in connection with the accompanying drawing, which is a cross-sectional view of a valve according to the present invention.

Referring now to the drawing in greater detail, the valve of the present invention comprises a valve body 1 separated into a low-pressure chamber $p$ and a high-pressure chamber P by a partition wall 2, the chambers having inlet and outlet connections 3 and 4. Wall 2 has a central bore therethrough in which a valve member in the form of a tube 6 is axially slidably disposed and sealed by seals 5. In the bottom of chamber P is mounted a valve seat 7 constituted by a disc carried by a rod 8 of relatively flexible material, for example polyamide or other synthetic resin, in such a manner as to permit adjustment of the abutment surface of the disc. To this end, the disc is carried by a screw 9.

The tube is urged toward a seated or closed position on the disc by a coil compression spring 10 that acts between wall 2 and an annular abutment on the portion of tube 6 which is disposed within chamber P.

In chamber $p$, a lever 11 is pivotally mounted at one end and pin connected to tube 6 with a pivotal lost motion connection and biased at its free end by a control means which may for example be a manometric bellows 12.

When tube 6 is seated on seat 7, then the forces acting to press tube 6 against seat 7 are the force of spring 10 plus the pressure in chamber $p$ multiplied by the cross-sectional area of the tube, that is, the area of the annulus occupied by the solid portion of tube 6. Let this quantity be designated as $ps$ where $s$ is the cross-sectional area of the solid part of tube 6.

But when the valve is open, that is, when the end of tube 6 is spaced from its seat 7, then the forces acting on the valve will be once more the force of spring 10, but this time in combination with the difference between the pressures in the chambers P and $p$, multiplied by the cross sectional area of the tube $s$. This quantity can be designated $(P-p)s$.

If the pressure in chamber P is greater than that in chamber $p$, then it will be seen that the force of the spring and the valve $(P-p)s$ are opposite in sign, that is, they act against each other. Therefore, in that case, the force tending to maintain the valve closed will be substantially greater than the force that tends to return the valve toward closed position once the valve is opened. Of course, if the spring force is less than the force due to pressure differential in the open valve position, then the valve will have equilibrium open and closed positions.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. A fluid flow control valve comprising a valve body with a rigid wall dividing the interior of the valve body into two chambers, an inlet communicating with one of said chambers and an outlet communicating with the other of said chambers, a tube open at both ends extending in axially sliding sealed relation through said rigid wall, a valve seat mounted in one of said chambers to receive and close one end of said tube, means resiliently urging one end of said tube closed against said seat, and means to exert a force on said tube against said urging means to open the valve.

2. A valve as claimed in claim 1, in which the means exerting a force on the tube against said urging means are manometric means.

3. A valve as claimed in claim 1, and a relatively flexible element mounting said valve seat on the internal wall of the valve body.

* * * * *